United States Patent Office 3,414,403
Patented Dec. 3, 1968

3,414,403
SILVER SEPARATION FROM AN ACID SOLUTION
Lane A. Bray and Robert Lee Moore, Richland, Wash., assignors to the United States of America as represented by the United States Atomic Energy Commission
No Drawing. Filed Apr. 8, 1966, Ser. No. 541,402
6 Claims. (Cl. 75—118)

The invention described herein was made in the course of, or under, a contract with the United States Atomic Energy Commission.

This invention concerns silver extraction over a specific range of pH values; more particularly the invention relates to a process for extracting silver from an acid solution.

Many processes now in use for the extraction of silver from its ores or from industrial waste solutions operate in basic pH ranges; however, many silver ore processing and industrial silver-containing waste solutions are acidic in nature. The conversion from acidic to basic environment is expensive not only because of the reagents involved but also because of the increased volume of the solutions.

Finding a silver separation process operable at comparatively low pH values has become more important with the growing silver shortage facing the government. Because of its position in the periodic table, an investigation into silver separation would logically begin with an examination of alkali and alkaline earth metal separation techniques. Alkaline earth extraction has been accomplished with organic materials such as alkyl phosphates in hydrocarbon diluents, long-chain phenols in aromatic hydrocarbons, and alkyl phosphates in combination with long-chain phenols. The following experiments were performed to ascertain the effectiveness of silver extraction as a function of pH by the above reagents.

The tables below show the distribution coefficient corresponding to various pH levels. The distribution coefficient (D.C.) is the ratio of silver concentration in the extract to the silver concentration in the raffinate. For an economic recovery process, distribution coefficients of nine, representing 90% extraction, are considered satisfactory at pH values around two.

In all of the experiment the aqueous solutions were 1 molar in sodium ion, 0.01 molar in silver ion, the organic to aqueous ratio was one, the temperature was 25° C. and the contact time was 15 minutes.

Experiment I

The organic extractant consisted of 0.4 molar di-2-ethylhexylphosphoric acid (D2EHPA) and 0.2 molar tributyl phosphate (TBP) in a kerosene diluent.

TABLE I

| pH: | D.C. |
|---|---|
| 0.2 | 0.005 |
| 0.3 | 0.004 |
| 0.7 | 0.007 |
| 1.1 | 0.016 |
| 2.1 | 0.074 |
| 2.3 | 0.124 |
| 2.3 | 0.129 |
| 2.45 | 0.117 |
| 2.3 | 0.116 |
| 2.4 | 0.118 |
| 2.6 | 0.129 |
| 2.3 | 0.118 |
| 2.4 | 0.164 |
| 2.5 | 0.149 |
| 3.25 | 0.796 |
| 4.8 | 7.28 |

Experiment II

The organic extractant consisted of 0.1 molar D2EHPA and 0.5 molar TBP in kerosene.

TABLE II

| pH: | D.C. |
|---|---|
| 1.1 | 0.006 |
| 2.25 | 0.06 |
| 2.9 | 0.5 |
| 3.85 | 1.13 |
| 4.6 | 0.94 |
| 5.4 | 9.8 |

Experiment III

The organic extractant consisted of 0.01 molar dipicrylamine nitrobenzene.

TABLE III

| pH: | D.C. |
|---|---|
| 0.1 | 0.006 |
| 0.7 | 0.018 |
| 1.45 | 0.039 |
| 2.2 | 1.149 |
| 4.1 | 1.64 |
| 11.0 | 14.9 |
| 11.7 | 14.7 |
| 12.2 | 15.6 |

The above data show that materials successful in alkaline earth extraction are unsatisfactory for silver extraction at low pH levels. None of the tested combinations approached the minimum design requirements; the best results were produced by dipicrylamine nitrobenzene with a distribution coefficient of 0.149 at a pH of 2.2 which is far below the 90% value required for an economic process.

The alkali metals have been extracted with similar combinations; however, extraction with the combination of long-chain phenols and alkyl phosphates in hydrocarbon diluents produced distribution coefficients which varied proportionately to ion size. A comparison of silver to the alkali metals showed that silver should extract with less efficiency than cesium. In contradistinction to the expected results, silver extraction with a combination of water-immiscible phenols and water-immiscible alkyl phosphoric acids produced distribution coefficients with unusually high values in the pH range of interest. Of particular interest because of their commercial availability were benzyl phenols and more specifically α-substituted benzyl phenols such as 4-(α,α-dimethyl benzyl) phenol or 4-sec-butyl-2-(α-methyl benzyl) phenol. The following experiment will show the unexpected peaks in the distribution coefficient values.

Experiment IV

The organic extractant consisted of 0.1 molar D2EHPA and 0.4 molar 4-sec-butyl-2-(α-methyl benzyl) phenol (BAMBP) in kerosene.

TABLE IV

| pH: | D.C. |
|---|---|
| 0.2 | 0.095 |
| 0.5 | 0.144 |
| 0.7 | 0.347 |
| 1.1 | 0.900 |
| 2.1 | 9.0 |
| 2.8 | 12.4 |
| 3.9 | 6.6 |
| 4.75 | 7.8 |
| 5.7 | 28.0 |
| 7.0 | 65.5 |
| 7.25 | 89.4 |
| 8.6 | 109.5 |

As readily seen from the data in Experiment IV, the distribution coefficient values peak at a pH range of about 2 to 3. This sudden rise, followed by a decline, in the distribution coefficent was fortuitous and fortunate in that it occurred at the percise pH value of interest.

The above examples are meant to be illustrative of the invention but are not to be construed as setting the limitations thereof; such is the purpose of the appended claims.

What is claimed is:

1. A process for the extraction of silver values from an aqueous solution, comprising adjusting the pH value of said solution to between about 2 and 3; contacting said solution with a substantially water-immiscible benzyl phenol and a substantially water-immiscible dialkyl phosphoric acid in which the alkyl group contains from 4 to 10 carbon atoms in a substantially water-immiscible aliphatic hydrocarbon, whereby said silver values are taken up by said organic phase; and separating said organic phase from said aqueous phase.

2. The process of claim 1 wherein the benzyl phenol is an α-substituted benzyl phenol.

3. The process of claim 2 wherein the α-substituted benzyl phenol is 4-sec-butyl-2-(α methyl benzyl) phenol.

4. The process of claim 2 wherein the α-substituted benzyl phenol is 4-(α,α-dimethyl benzyl) phenol.

5. The process of claim 1 wherein the dialkyl phosphoric acid is di-2-ethylhexylphosphoric acid.

6. The process of claim 1 wherein the phenol is 4-sec-butyl-2-(α methyl benzyl) phenol in a concentration of 0.4 molar, the phosphoric acid is di-2-ethylhexylphosphoric acid in a concentration of 0.1 molar, and the aliphatic hydrocarbon is kerosene.

References Cited

UNITED STATES PATENTS

| 2,955,932 | 10/1960 | Goren | 75—121 |
| 2,744,007 | 5/1956 | Givaitis et al. | 75—121 |

FOREIGN PATENTS

| 663,633 | 5/1963 | Canada. |

L. DEWAYNE RUTLEDGE, *Primary Examiner.*

T. R. FRYE, *Assistant Examiner.*